(12) United States Patent
Jun

(10) Patent No.: US 12,298,659 B2
(45) Date of Patent: May 13, 2025

(54) APERTURE MODULE AND CAMERA MODULE INCLUDING THE SAME

(71) Applicant: SAMSUNG ELECTRO-MECHANICS CO., LTD., Suwon-si (KR)

(72) Inventor: Jaewoo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 98 days.

(21) Appl. No.: 18/110,532

(22) Filed: Feb. 16, 2023

(65) Prior Publication Data

US 2024/0061319 A1 Feb. 22, 2024

(30) Foreign Application Priority Data

Aug. 19, 2022 (KR) .................. 10-2022-0104263

(51) Int. Cl.
| | |
|---|---|
| *G03B 9/06* | (2021.01) |
| *G03B 9/18* | (2021.01) |
| *G03B 30/00* | (2021.01) |
| *H04N 23/55* | (2023.01) |

(52) U.S. Cl.
CPC .............. *G03B 9/06* (2013.01); *G03B 9/18* (2013.01); *G03B 30/00* (2021.01); *H04N 23/55* (2023.01)

(58) Field of Classification Search
CPC ........... G03B 9/09; G03B 30/00; G02B 5/005
See application file for complete search history.

(56) References Cited

U.S. PATENT DOCUMENTS

| | | | |
|---|---|---|---|
| 7,472,998 B2 | 1/2009 | Sasazaki et al. | |
| 10,824,051 B2 * | 11/2020 | Seo .................. | G03B 13/36 |
| 11,226,539 B2 * | 1/2022 | Jun .................. | G03B 30/00 |
| 2015/0037024 A1 | 2/2015 | Zhou et al. | |
| 2019/0377238 A1 | 12/2019 | Kim et al. | |
| 2020/0241387 A1 | 7/2020 | Seo et al. | |

(Continued)

FOREIGN PATENT DOCUMENTS

| | | |
|---|---|---|
| CN | 203490446 U | 3/2014 |
| CN | 113259545 A | 8/2021 |

(Continued)

OTHER PUBLICATIONS

Korean Office Action issued on Aug. 27, 2024, in counterpart Korean Patent Application No. 10-2022-0104263 (7 pages in English, 5 pages in Korean).

(Continued)

*Primary Examiner* — Leon W Rhodes, Jr.
(74) *Attorney, Agent, or Firm* — NSIP Law

(57) ABSTRACT

An aperture module includes a rotating plate, seated on a base having a center opening, configured to rotate about an optical axis; an aperture driver including a moving member coupled to the rotating plate, wherein the moving member is configured to linearly reciprocate; and a plurality of blades stacked as at least two stages on the rotating plate, disposed non-overlapping to each other on the respective stages, and configured to form a variable light incident hole interlocked with rotation of the rotating plate. A cusp of adjacent ones of the blades has an extending corner portion generated when straight lateral sides of the adjacent ones of the blades meet each other.

19 Claims, 13 Drawing Sheets

(56) References Cited

U.S. PATENT DOCUMENTS

2020/0409234 A1  12/2020  Jun
2022/0382128 A1  12/2022  Lee

FOREIGN PATENT DOCUMENTS

| JP | 2003-348815 A | 12/2003 |
|---|---|---|
| JP | 2018-205477 A | 12/2018 |
| KR | 10-2015-0003182 A | 1/2015 |
| KR | 10-2019-0139657 A | 12/2019 |
| KR | 10-2185053 B1 | 12/2020 |
| KR | 10-2021-0001635 A | 1/2021 |

OTHER PUBLICATIONS

Korean Notice of Allowance issued on Mar. 26, 2025, in corresponding Korean Patent Application No. 10-2022-0104263. (4pages in English, 4pages in Korean).

\* cited by examiner

APERTURE MODULE AND CAMERA MODULE INCLUDING THE SAME

CROSS-REFERENCE TO RELATED APPLICATION

This application claims the benefit under 35 USC 119(a) of Korean Patent Application No. 10-2022-0104263 filed in the Korean Intellectual Property Office on Aug. 19, 2022, the entire contents of which are incorporated herein by reference for all purposes.

BACKGROUND

1. Field

The present disclosure relates to an aperture module and a camera module including the same.

2. Description of the Related Art

Cameras are now employed in portable electronic devices such as smartphones, tablet PCs, and laptops. As competition for product differentiation of portable electronic devices deepens, more digital camera functions are being added to cameras of portable electronic devices. Among them is an increase in the need for obtaining the bokeh effect or bright and sharp photographs by adjusting the amount of light by varying the aperture.

Typical digital cameras have a mechanical aperture that is driven to change the amount of input light depending on photographic conditions. However, applying typical mechanical apertures to camera modules in small devices such as portable electronic devices is difficult because of structural characteristics and spatial limits.

That is, the mechanical aperture applied to the general digital cameras has many parts and is thickened as a plurality of rotation-type blades have a circular aperture structure as drawbacks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an aperture module includes a rotating plate, seated on a base having a center opening, configured to rotate about an optical axis; an aperture driver including a moving member coupled to the rotating plate, wherein the moving member is configured to linearly reciprocate; and a plurality of blades stacked as at least two stages on the rotating plate, disposed non-overlapping to each other on the respective stages, and configured to form a variable light incident hole interlocked with rotation of the rotating plate. A cusp of adjacent ones of the blades has an extending corner portion generated when straight lateral sides of the adjacent ones of the blades meet each other.

Each of the blades may have a pentagonal contour having a least internal angle formed at the cusp.

The moving member may include an aperture driving magnet facing an aperture driving coil.

The blades may be stacked as two stages on the rotating plate, and groups of at least four blades disposed in a diagonal line at the respective stages may be disposed to be point symmetric with each other.

Each of the blades may include a driving section having a fixed axis hole configured to engage a fixed axis protrusion protruding from the base, and a guide slit configured to engage a guide protrusion protruding from the rotating plate, and a shield section may extend along an exterior circumference of the rotating plate from the driving section when the center opening of the base is completely opened.

Each shield section of the blades may include the cusp.

Each shield section of the blades may extend toward the center opening when the center opening of the base is completely closed.

When the blades are stacked with the center opening of the base completely opened, the driving section of a blade disposed at a lower stage of the at least two stages in a stacking direction may overlap the shield section of a blade disposed at an upper stage of the at least two stages in the stacking direction.

When the blades are stacked with the center opening of the base completely closed, the shield section of a blade disposed at a lower stage of the at least two stages in the stacking direction may overlap the shield section of a blade disposed at an upper stage of the at least two stages in the stacking direction.

Each of the blades may be disposed to partially overlap two blades disposed at an upper or lower stage of the at least two stages.

A camera module may include a lens driving module configured to be driven in an optical axis direction or a perpendicular direction to the optical axis, and the aperture module.

In another general aspect, a camera module includes a housing having an internal space; a lens driving module, accommodated in the internal space, configured to be driven in an optical axis direction or a perpendicular direction to the optical axis; and an aperture module, disposed at a front of the lens driving module, configured to adjust of an aperture. The aperture module includes a rotating plate, seated on a base having a center opening, configured to rotate about an optical axis; an aperture driver including a moving member coupled to the rotating plate, wherein the moving member is configured to linearly reciprocate; and a plurality of blades stacked as at least two stages on the rotating plate, disposed non-overlapping to each other on the respective stages, and configured to form a variable light incident hole interlocked with rotation of the rotating plate. A cusp of adjacent ones of the blades has an extending corner portion generated when straight lateral sides of the adjacent ones of the blades meet each other.

Each of the blades may have a pentagonal contour having a least internal angle formed at the cusp.

The moving member may include an aperture driving magnet facing an aperture driving coil.

The aperture driving coil may be fixed to one side wall of the housing.

In another general aspect, an aperture module includes a rotating plate, seated on a base having a center opening, configured to rotate about an optical axis; an aperture driver including a moving member coupled to the rotating plate, wherein the moving member is configured to linearly reciprocate; and a plurality of blades, a first subset of the blades disposed on the rotating plate to be spaced apart from each other, and a second subset of the blades disposed on the first subset of the blades to partially overlap the first subset of the blades. A variable aperture is formed with linear reciprocating movement of the moving member. Straight lateral sides of the blades form the variable aperture when the center opening is completely opened, and apexes of the blades form the variable aperture when the center opening is completely closed.

Each of the blades may have a pentagonal contour.

The moving member may include an aperture driving magnet facing an aperture driving coil.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
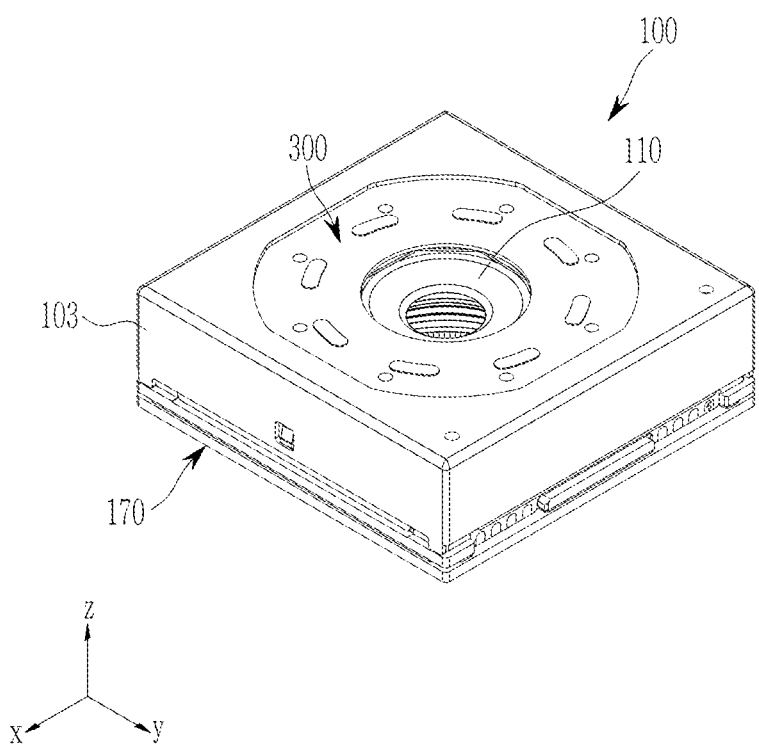
FIG. 1 shows a perspective view of an exterior of a camera module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The phrase "in a plan view" or "on a plane" means viewing a target portion from the top, and the phrase "in a cross-sectional view" or "on a cross-section" means viewing a cross-section formed by perpendicularly cutting a target portion from the side.

Figure 2:
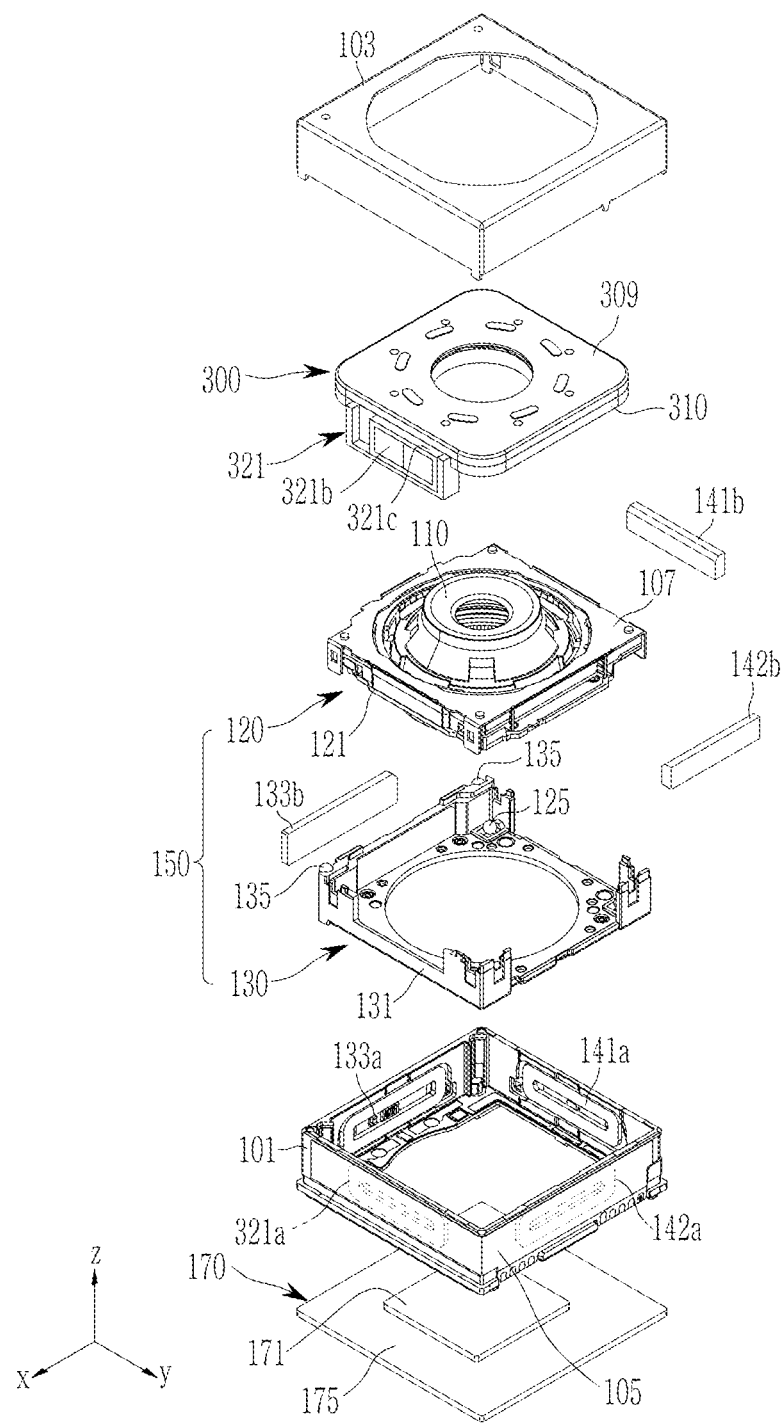
FIG. 2 shows an exploded perspective view of a camera module shown in FIG. 1.

FIG. 1 shows a perspective view of an exterior of a camera module according to an embodiment, and FIG. 2 shows an exploded perspective view of a camera module shown in FIG. 1.

Referring to FIG. 1 and FIG. 2, the camera module 100 includes a lens barrel 110, a lens driving module 150 for moving the lens barrel 110, an aperture module 300 for adjusting a size of a light incident hole, and an image sensor unit 170 for converting incident light into electrical signals. The lens barrel 110 and the lens driving module 150 are received in a housing 101 together with an aperture module 300, and the housing 101 is covered by the cover 103.

The lens barrel 110 may have a hollow space in a cylindrical shape for receiving a plurality of lenses for photographing a subject into the lens barrel 120, and the lenses are mounted in the lens barrel 110 along an optical axis. A desired number of lenses may be disposed based on the design of the lens barrel 110, and the respective lenses may have optical characteristics such as identical or different refractive indexes.

The lens driving module 150 installs the lens barrel 110 and moves the same and includes an AF (Auto Focus) unit 130 for adjusting focuses and an OIS (Optical Image Stabilization) unit 120 for correcting hand trembling or shakes. For example, the lens driving module 150 may adjust the focus by moving the lens barrel 110 in an optical axis direction (z-axis direction in the drawing) by using the AF unit 130 or may realize a zoom function, and may correct the hand trembling or shakes at the time of photographing by moving the lens barrel 110 in a direction (x-axis or y-axis direction in the drawing) that is perpendicular to the optical axis direction by using the OIS unit 120.

The AF unit 130 includes an AF carrier 131 for receiving the lens barrel 110, and an AF driver for generating a driving force to move the lens barrel 110 and the AF carrier 131 in the optical axis direction. The AF driver includes an AF driving magnet 133b and an AF driving coil 133a. The AF driving magnet 133b may be installed on one side of the AF carrier 131, and the AF driving coil 133a may be installed in the housing 101 with a substrate 105 as a medium. A rolling member 135 in a ball shape may be disposed between the AF carrier 131 and the housing 101 to reduce friction therebetween when the AF carrier 131 moves.

The OIS unit 120 includes an OIS carrier 121 for guiding the movement of the lens barrel 110 and an OIS driver for generating a driving force for moving the OIS carrier 121 in the direction perpendicular to the optical axis direction. The OIS carrier 121 is received in the AF carrier 131, is arranged in the optical axis direction, and guides the movement of the lens barrel 110. In addition, OIS carrier 121 includes a center opening in which the lens barrel 110 is inserted, and the lens barrel 110 is combined and fixed to the OIS carrier 121 through the center opening.

The OIS driver includes a first OIS driver, including a first OIS driving coil 141a and a first OIS driving magnet 141b, and a second OIS driver, including a second OIS driving coil 142a and a second OIS driving magnet 142b. The first and second OIS driving magnets 141b and 142b are installed in the OIS carrier 121, and the first and second OIS driving coils 141a and 142a, respectively, facing the first and second OIS driving magnets 141b and 142b may be installed to be fixed to the housing 101 with the substrate 105 as a medium.

The first OIS driver generates a driving force in a first direction (x-axis direction in the drawing) that is perpendicular to the optical axis direction, and the second OIS driver generates a driving force in a second direction (y-axis direction in the drawing) that is perpendicular to the optical axis and the first direction. A plurality of rolling members 125 in a ball shape may be provided between the AF carrier 131 and the OIS carrier 121 to allow the elements of the OIS unit 120 to move smoothly.

The image sensor unit 170 converts light input through the lens barrel 110 into electric signals. For example, the image sensor unit 170 may include an image sensor 171 and a flexible printed circuit (FPC) 175 connected thereto, and may further include an infrared ray filter. The infrared ray filter blocks light in the infrared ray region from among the light input through the lens barrel 110.

Referring to FIG. 2, the aperture module 300 applied to the camera module 100 may be disposed on an upper surface of the lens driving module 150, and may be positioned at the front of the lens driving module 150 with respect to a light incident direction. The aperture module 300 may be combined to the lens driving module 150 and may move in the optical axis direction, the first direction, and the second direction together with the lens driving module 150. The aperture module 300 may selectively change an incident amount of light input to the lens driving module 150.

The aperture module 300 includes an aperture driver 321 extending to a bottom side of the housing 101 from an edge on one side and received in an internal space of the housing 101. The aperture driver 321 includes an aperture driving magnet 321b facing the aperture driving coil 321a installed in the housing 101 with the substrate 105 as a medium. The aperture driving magnet 321b may be installed in the moving member 321c and may move back and forth in a straight line.

When the aperture driving coil 321a is turned on, the moving member 321c, having received the aperture driving magnet 321b, may move back and forth in a straight line in a direction that is perpendicular to the optical axis direction by an electromagnetic force between the aperture driving magnet 321b and the aperture driving coil 321a. The moving member 321c may be coupled to a rotating plate 330 on a base 310 to provide a driving force so the back-and-forth linear movement of the moving member 321c in a straight line is converted to a rotation of the rotating the plate 330, and the size of the light incident hole of the aperture module 300 may be adjusted.

Figure 3:
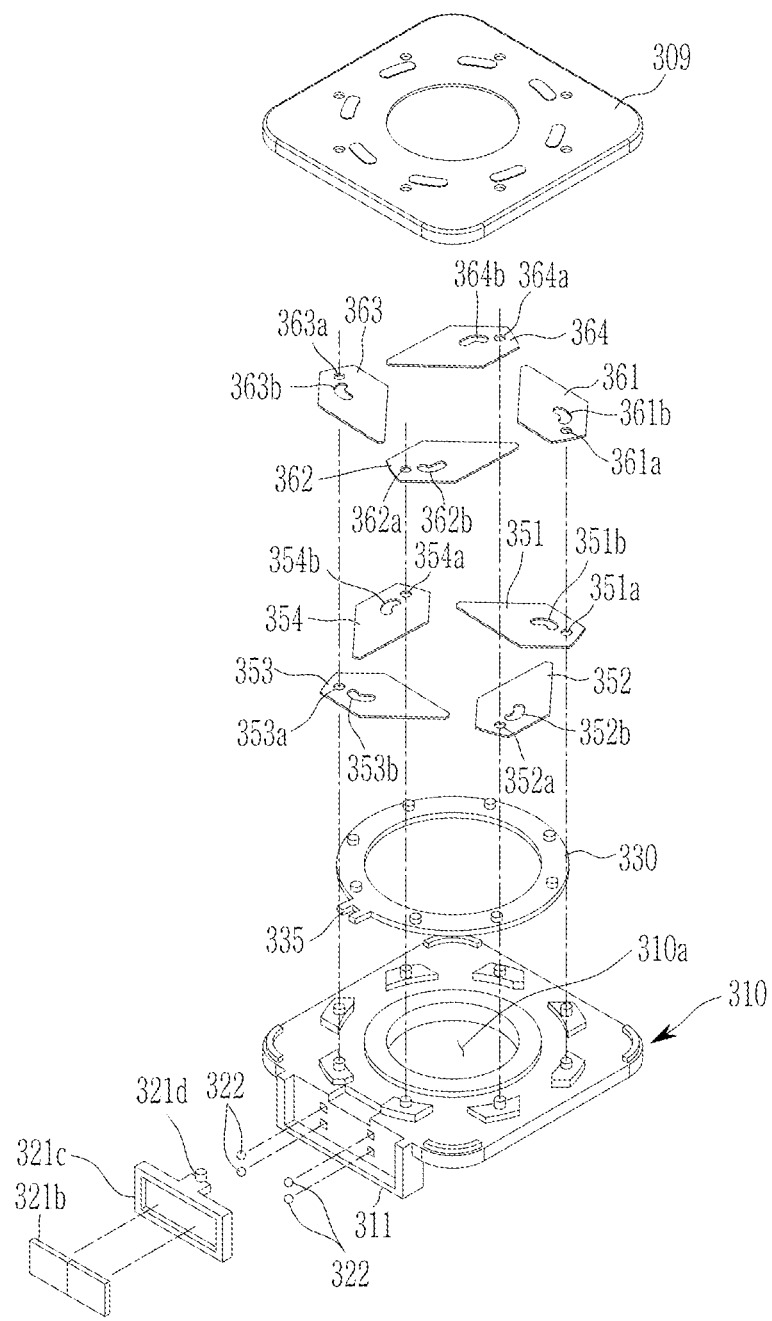
FIG. 3 shows an exploded perspective view of an aperture module shown in FIG. 2.

FIG. 3 shows an exploded perspective view of an aperture module shown in FIG. 2.

Referring to FIG. 3, the aperture module 300, according to the present embodiment, may be configured by sequentially stacking the rotating plate 330 and a plurality of blades 351, 352, 353, 354, 361, 362, 363, and 364 on the base 310 in the optical axis direction and combining them. The blades may be stacked in two stages. First-stage blades 351, 352, 353, and 354 may be seated on the rotating plate 330, and second-stage blades 361, 362, 363, and 364 may be seated on the first-stage blades 351, 352, 353, and 354. Four of the blades 351, 352, 353, 354, 361, 362, 363, and 364 are disposed on the respective stages or planes, thereby providing the configuration of two-stage eight-sheet blades. For another example, three sheets, five sheets, and six sheets may be disposed for each step to provide a blade configuration of two-stage, thus six sheets, two-stage ten sheets, and two-stage twelve sheets, also belong to the range of the present disclosure.

Regarding the aperture module 300, an aperture driver 321 may be disposed on one-side edge of the base 310. The aperture driver 321 includes a moving guide 311 of which one edge of the base 310 extends backward with respect to the light incident direction. A moving member 321c, including an aperture driving magnet 321b facing the aperture driving coil 321a may be disposed in the moving guide 311 and may move back and forth in a straight line. A rolling member 322 in a ball shape may be provided between the moving member 321c and the moving guide 311 to reduce a friction force and allow fluent movement of the moving member 321c.

The aperture driver 321 may include a driving protrusion 321d protruding upward at an end of an arm extending from an upper surface of the moving member 321c. The driving protrusion 321*d* may be combined to a protrusion fastening groove 335 of the rotating plate 330. Hence, the moving member 321*c* of the aperture driver 321 may be interlocked with the rotating plate 330 and may be driven. The driving protrusion 321*d* is combined in a relatively rotatable way in the protrusion fastening groove 335. Therefore, the back-and-forth movement of the moving member 321*c* in a straight line may be converted to a rotation of the rotating plate 330.

An aperture cover 309 may be combined with an upper surface of the base 310 to cover the same, thereby protecting parts of the aperture module 300.

FIG. 4 to FIG. 8 show perspective views of a process for assembling elements of an aperture module shown in FIG. 3.

Figure 4:
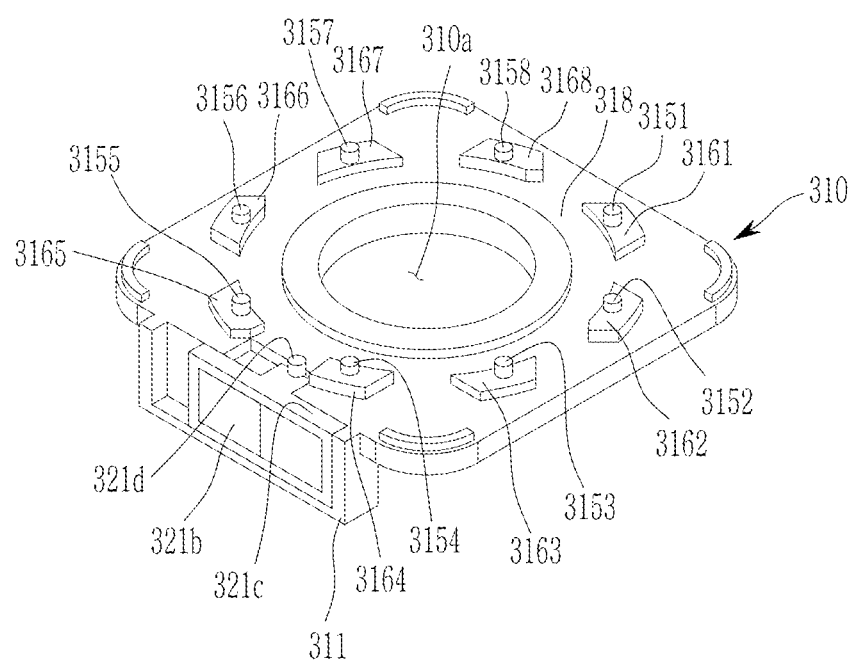
FIG. 4 to FIG. 8 show perspective views of a process for assembling elements of an aperture module shown in FIG. 3.

Referring to FIG. 4, the base 310 may have a center opening 310*a* and may have a quadrangular or square shape in a plan view. The base 310 may include a seating groove 318 in which the rotating plate 330 is seated, and a plurality of seating blocks 3161, 3162, 3163, 3164, 3165, 3166, 3167, and 3168 in which a plurality of blades 351, 352, 353, 354, 361, 362, 363, and 364 are seated along an exterior circumference of the seating groove 318. The seating groove 318 may have a shape that fits the shape of the rotating plate 330, for example, a ring shape. Fixed axis protrusions 3151, 3152, 3153, 3154, 3155, 3156, 3157, and 3158 may be disposed on the respective seating blocks 3161, 3162, 3163, 3164, 3165, 3166, 3167, and 3168.

Figure 5:
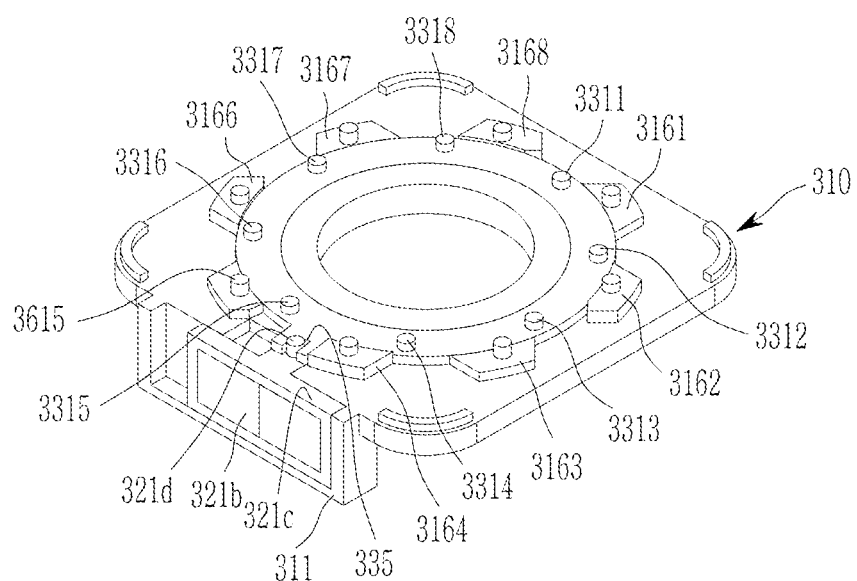

Referring to FIG. 5, the rotating plate 330 may be inserted into the seating groove 318 of the base 310. The rotating plate 330 inserted into the seating groove 318 may be maintained to have a same height as the seating blocks 3161, 3162, 3163, 3164, 3165, 3166, 3167, and 3168 of the base 310.

The rotating plate 330 may have a ring-type circular plate, and may be seated on the base 310 to be rotatable with respect to the optical axis. A plurality of guide protrusions 3311, 3312, 3313, 3314, 3315, 3316, 3317, and 3318 may be spaced at regular intervals on the rotating plate 330. The protrusion fastening groove 335 may be formed on one external side of the rotating plate 330 to engage with the moving member 321*c*.

The arm extending from the moving member 321*c* may be positioned on an upper side of the base 310, and the driving protrusion 321*d* may protrude upward therefrom and may be positioned in the protrusion fastening groove 335 of the rotating plate 330. The protrusion fastening groove 335 of the rotating plate 330 may be opened to an outside of a radial direction and may be closed in respective sides of the circumferential direction so a relative rotation with the driving protrusion 321*d* may be configured to have no limits.

Figure 6:
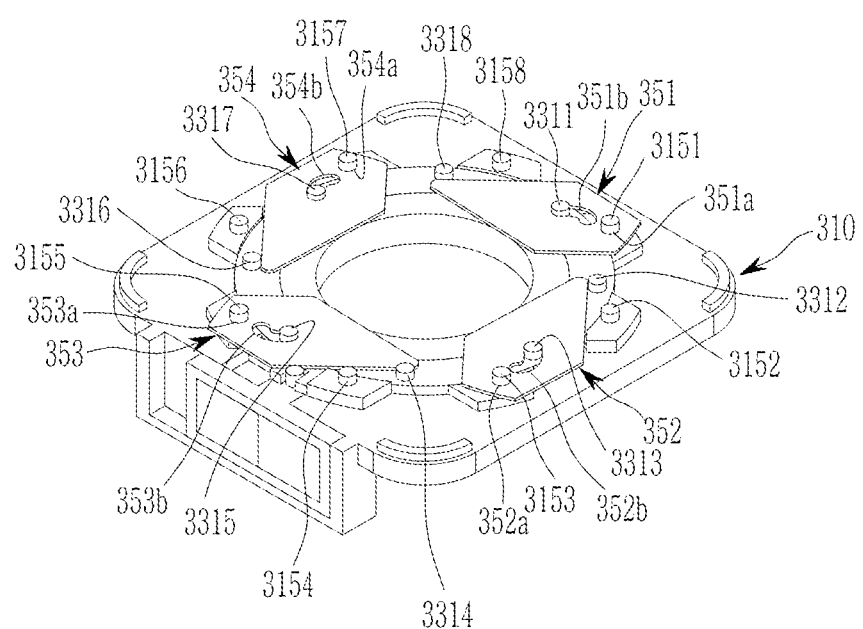
Figure 7:
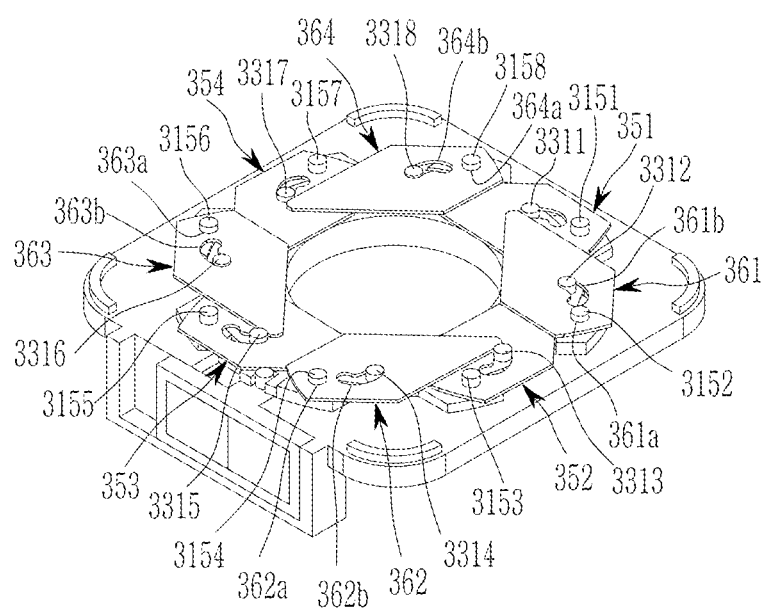

Referring to FIG. 6 and FIG. 7, in the present embodiment, a plurality of blades 351, 352, 353, 354, 361, 362, 363, and 364 may be sequentially stacked in two stages or planes on the rotating plate 330. The first-stage blades 351, 352, 353, and 354 are seated on the rotating plate 330, and the second-stage blades 361, 362, 363, and 364 may be stacked to partially overlap the same thereon. Respective fours of the blades 351, 352, 353, 354; 361, 362, 363, and 364 disposed in a diagonal line may be disposed to be point symmetric with each other with respect to an opening center 310*a* of the base 310. The blades 351, 352, 353, 354, 361, 362, 363, and 364 may partly overlap two blades 351, 352, 353, 354, 361, 362, 363, and 364, respectively, disposed on the neighboring upper stage or lower stage while the center opening 310*a* of the base 310 is completely opened.

The blades 351, 352, 353, 354, 361, 362, 363, and 364 include fixed axis holes 351*a*, 352*a*, 353*a*, 354*a*, 361*a*, 362*a*, 363*a*, and 364*a*, respectively, combined to the fixed axis protrusions 3151, 3152, 3153, 3154, 3155, 3156, 3157, and 3158 of the base 310 and guide slits 351*b*, 352*b*, 353*b*, 354*b*, 361*b*, 362*b*, 363*b*, and 364*b* combined to the guide protrusions 3311, 3312, 3313, 3314, 3315, 3316, 3317, and 3318 of the rotating plate 330. Regarding the blades 351, 352, 353, 354, 361, 362, 363, and 364, the fixed axis holes 351*a*, 352*a*, 353*a*, 354*a*, 361*a*, 362*a*, 363*a*, and 364*a* may be disposed near a one-side end, and the guide slits 351*b*, 352*b*, 353*b*, 354*b*, 361*b*, 362*b*, 363*b*, and 364*b*, respectively, may be penetration holes extending in a curved way in a curve and may be disposed near the fixed axis holes 351*a*, 352*a*, 353*a*, 354*a*, 361*a*, 362*a*, 363*a*, and 364*a*. The first-stage blades 351, 352, 353, and 354 and the second-stage blades 361, 362, 363, and 364 may be alternately combined to the guide protrusions 3311, 3312, 3313, 3314, 3315, 3316, 3317, and 3318 of the rotating plate 330 along the exterior circumference of the rotating plate 330.

Figure 8:
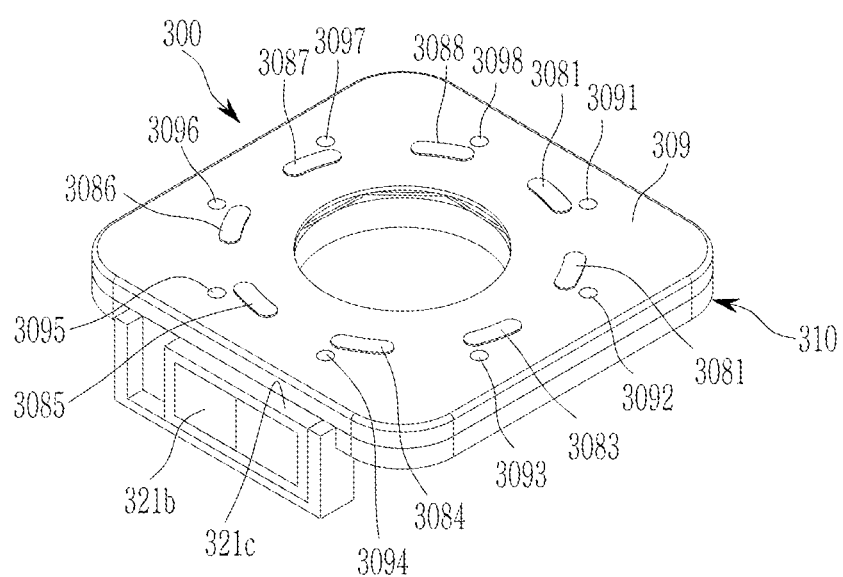

Referring to FIG. 8, the aperture cover 309 may be combined to the upper surface of the base 310 to cover the rotating plate 330, the driving protrusion 321*d*, and the blades 351, 352, 353, 354, 361, 362, 363, and 364 combined to the base 310. In this instance, the aperture cover 309 may include fixed axis grooves 3091, 3092, 3093, 3094, 3095, 3096, 3097, and 3098 formed, by upward embossing, in portions that correspond to the fixed axis protrusions 3151, 3152, 3153, 3154, 3155, 3156, 3157, and 3158 of the base 310 and guide grooves 3081, 3082, 3083, 3084, 3085, 3086, 3087, and 3088 formed, by upward embossing, in portions that correspond to paths of the guide protrusions 3311, 3312, 3313, 3314, 3315, 3316, 3317, and 3318 of the rotating plate 330. The fixed axis grooves 3091, 3092, 3093, 3094, 3095, 3096, 3097, and 3098, and the guide grooves 3081, 3082, 3083, 3084, 3085, 3086, 3087, and 3088, respectively, receive upper surfaces of the fixed axis protrusions 3151, 3152, 3153, 3154, 3155, 3156, 3157, and 3158 and the guide protrusions 3311, 3312, 3313, 3314, 3315, 3316, 3317, and 3318, thereby maintaining the fixed axis protrusions 3151, 3152, 3153, 3154, 3155, 3156, 3157, and 3158, while not hindering the movement of the guide protrusions 3311, 3312, 3313, 3314, 3315, 3316, 3317, and 3318, and maintaining the height of the aperture module 300 to be low.

Figure 9:
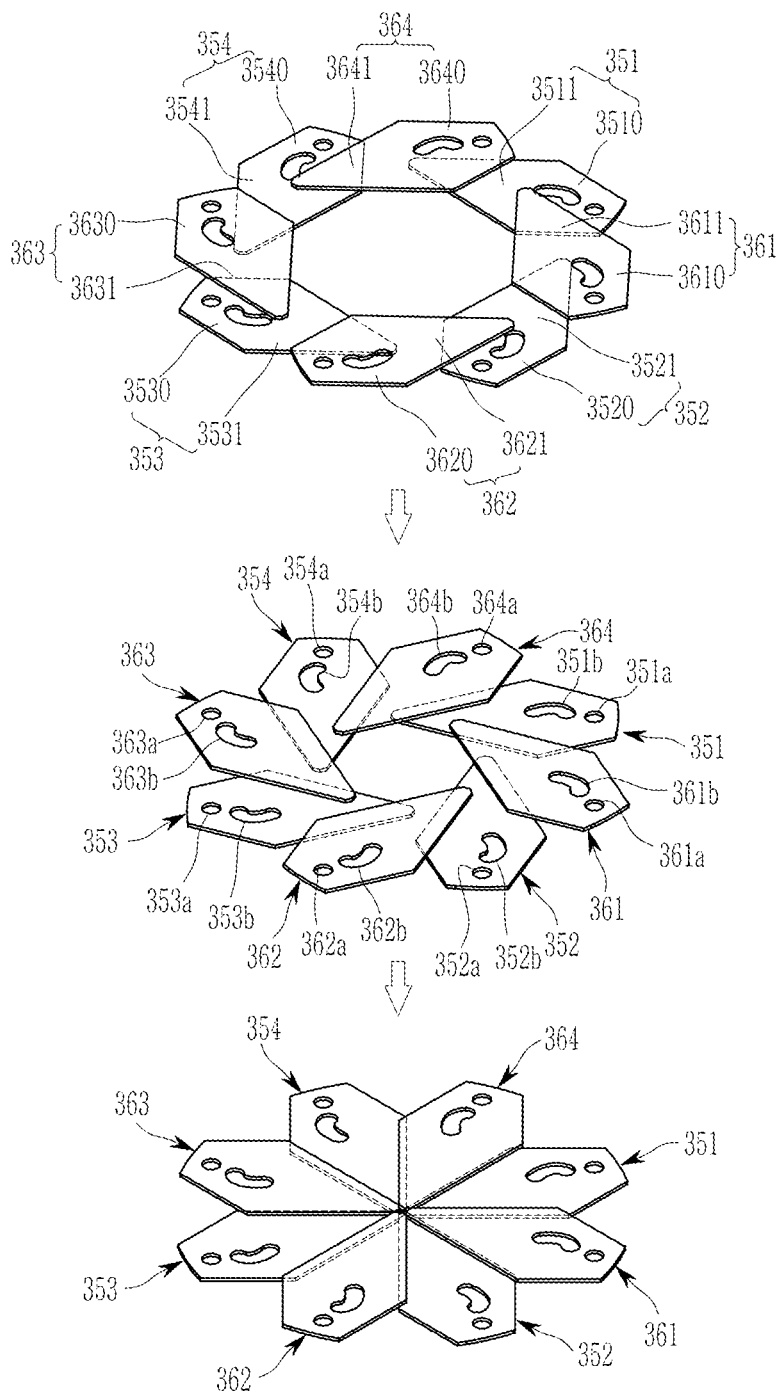
FIG. 9 shows a perspective view of changes of a stacking structure according to an opened/closed state of a blade applied to an aperture module shown in FIG. 3.
Figure 10A:
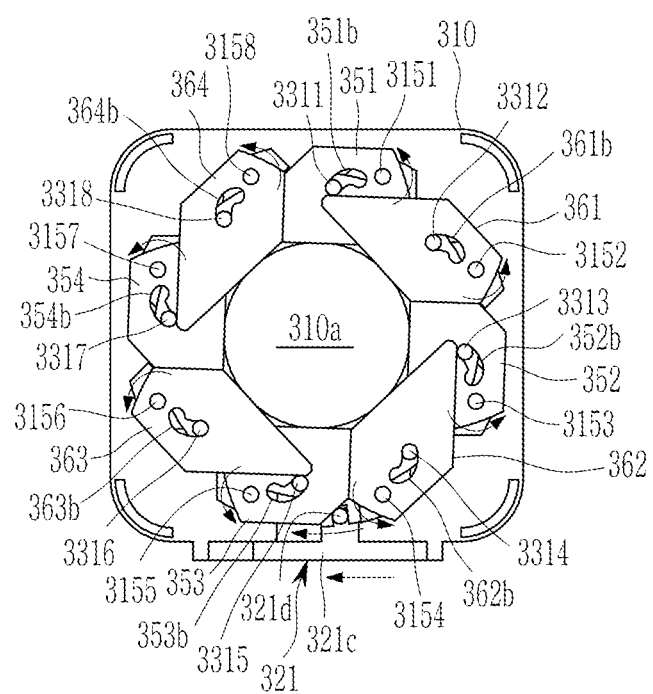
FIG. 10A to FIG. 10D sequentially show top plan views of a process for driving an aperture module shown in FIG. 3.
Figure 10B:
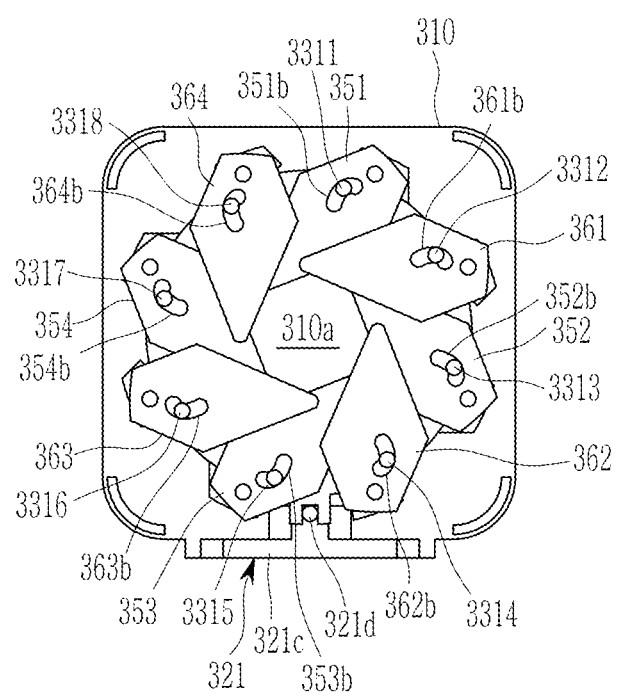
Figure 10C:
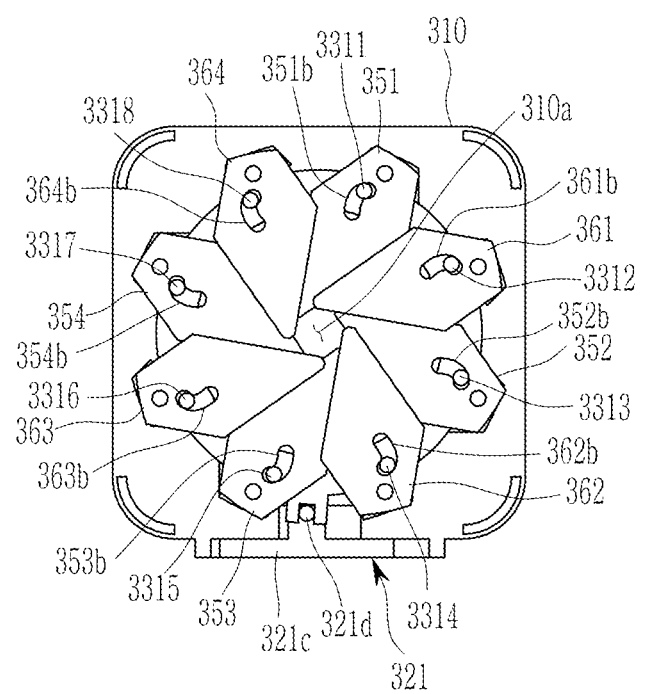
Figure 10D:
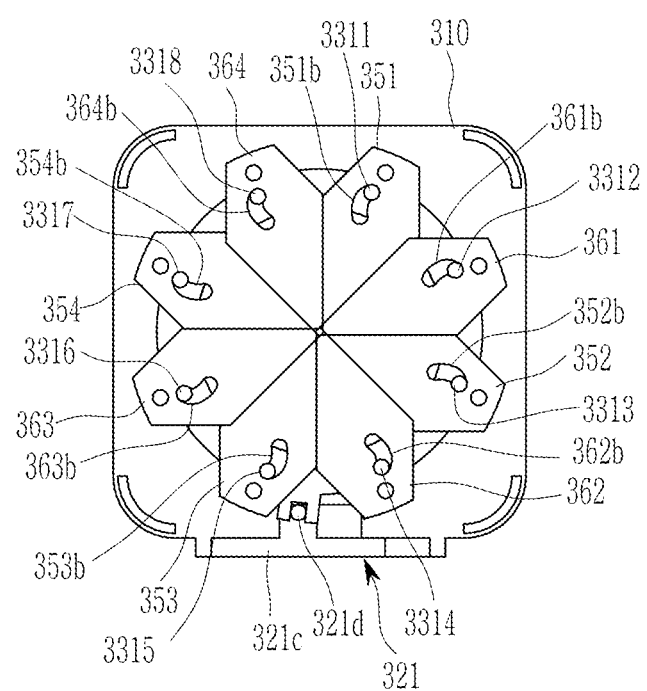

FIG. 9 shows a perspective view of changes of a stacking structure according to an opened/closed state of a blade applied to an aperture module shown in FIG. 3.

Referring to FIG. 9, the respective blades 351, 352, 353, 354, 361, 362, 363, and 364 may include driving sections 3510, 3520, 3530, 3540, 3610, 3620, 3630, and 3640 driven to rotate with respect to the fixed axis protrusions 3151, 3152, 3153, 3154, 3155, 3156, 3157, and 3158 (refer to FIG. 4) when mounted on the base 310 (refer to FIG. 3), and shield sections 3511, 3521, 3531, 3541, 3611, 3621, 3631, and 3641 extending therefrom. The driving sections 3510, 3520, 3530, 3540, 3610, 3620, 3630, and 3640 of the blade may include fixed axis holes 351*a*, 352*a*, 353*a*, 354*a*, 361*a*, 362*a*, 363*a*, and 364*a* and guide slits 351*b*, 352*b*, 353*b*, 354*b*, 361*b*, 362*b*, 363*b*, and 364*b*. When mounted on the rotating plate 330, the shield sections 3511, 3521, 3531, 3541, 3611, 3621, 3631, and 3641 of the blade may extend along the exterior circumference of the rotating plate 330 from the driving sections 3510, 3520, 3530, 3540, 3610, 3620, 3630, and 3640 while the center opening 310*a* (refer to FIG. 4) of the base 310 is completely opened.

The driving sections 3510, 3520, 3530, 3540, 3610, 3620, 3630, and 3640 of the blade receive the driving force from the rotating plate 330 and start to move, and the shield sections 3511, 3521, 3531, 3541, 3611, 3621, 3631, and 3641 of the blade shield the center opening 310a (resultantly, the opening of the lens) of the base 310 according to the motions of the driving sections 3510, 3520, 3530, 3540, 3610, 3620, 3630, and 3640 and adjust the size of the light incident hole. The respective blades 351, 352, 353, 354, 361, 362, 363, and 364 may be driven to rotate with respect to the fixed axis holes 351a, 352a, 353a, 354a, 361a, 362a, 363a, and 364a of the driving section so that the shield sections 3511, 3521, 3531, 3541, 3611, 3621, 3631, and 3641 may open and close the center opening 310a of the base 310.

The shield sections 3511, 3521, 3531, 3541, 3611, 3621, 3631, and 3641 of the respective blades may have cusps. Regarding the respective blades 351, 352, 353, 354, 361, 362, 363, and 364, the cusps may be formed by extending a corner portion generated when two lateral sides meet each other. The respective blades 351, 352, 353, 354, 361, 362, 363, and 364 may have a pentagonal plane, and may be formed so that an internal angle of the cusp may be smallest. The two lateral sides forming the cusp may be made with a straight line.

The blades 351, 352, 353, 354, 361, 362, 363, and 364 may be stacked so that the driving sections 3510, 3520, 3530, 3540, 3610, 3620, 3630, and 3640 of the blade disposed at the lower stage of the stacking direction may overlap the shield sections 3511, 3521, 3531, 3541, 3611, 3621, 3631, and 3641 of the blade disposed at the upper stage of the stacking direction while the center opening 310a of the base 310 is completely opened. That is, the second-stage blades 351, 352, 353, 354, 361, 362, 363, and 364 that are stacked on the disposed first-stage blades 351, 352, 353, 354, 361, 362, 363, and 364 may be stacked so that the driving sections 3510, 3520, 3530, 3540, 3610, 3620, 3630, and 3640 of the first-stage blade may overlap the shield sections 3511, 3521, 3531, 3541, 3611, 3621, 3631, and 3641 of the second-stage blades 351, 352, 353, 354, 361, 362, 363, and 364.

The blades 351, 352, 353, 354, 361, 362, 363, and 364 may be stacked so that, while the center opening 310a of the base 310 is completely closed, the shield sections 3511, 3521, 3531, 3541, 3611, 3621, 3631, and 3641 of the blade disposed at a lower stage in the stacking direction may overlap the shield sections 3511, 3521, 3531, 3541, 3611, 3621, 3631, and 3641 of the blade disposed at the upper stage in the stacking direction. That is, when the light incident hole of the aperture module 300 is closed as the blades 351, 352, 353, 354, 361, 362, 363, and 364 are driven by the aperture driver 321 and rotate, the blades 351, 352, 353, 354, 361, 362, 363, and 364 disposed at the first stage and the second stage may move to overlap each other in the shield sections 3511, 3521, 3531, 3541, 3611, 3621, 3631, and 3641. Therefore, a fluent motion is possible without collision among the blades 351, 352, 353, 354, 361, 362, 363, and 364 when the light incident hole of the aperture module 300 is reduced.

The shield sections 3511, 3521, 3531, 3541, 3611, 3621, 3631, and 3641 of the respective blades may extend toward the center opening while the center opening 310a of the base 310 is completely closed. That is, the blades 351, 352, 353, 354, 361, 362, 363, and 364 disposed in the diagonal direction with respect to the opening center of the base 310 may be arranged so that the cusps of the shield sections 3511, 3521, 3531, 3541, 3611, 3621, 3631, and 3641 may face each other. Hence, the blades 351, 352, 353, 354, 361, 362, 363, and 364 may form a minimally overlapping region and may close the light incident hole.

FIG. 10A to FIG. 10D sequentially show top plan view of a process for driving an aperture module shown in FIG. 3.

Referring to FIG. 10A to FIG. 10D, a power voltage is supplied to the aperture driving coil 321a so the moving member 321c, having received the aperture driving magnet 321b facing the same, may move in a straight line in the direction in parallel to a one-side edge of the base 310. Hence, the rotating plate 330 coupled to the moving member 321c through the driving protrusion 321d may rotate in a clockwise direction, and may drive the blades 351, 352, 353, 354, 361, 362, 363, and 364 combined to the rotating plate 330.

As the guide protrusions 3311, 3312, 3313, 3314, 3315, 3316, 3317, and 3318 of the rotating plate 330 move along the guide slits 351b, 352b, 353b, 354b, 361b, 362b, 363b, and 364b of the blades 351, 352, 353, 354, 361, 362, 363, and 364, the blades 351, 352, 353, 354, 361, 362, 363, and 364 rotate with respect to the fixed axis protrusions 3151, 3152, 3153, 3154, 3155, 3156, 3157, and 3158 of the base 310, and the shield section gradually shields the center opening 310a of the base 310. In this instance, an edge of the light incident hole of the aperture module 300 may be configured to form a square shape up to an octagon by lateral sides of the blades 351, 352, 353, 354, 361, 362, 363, and 364.

When the moving member 321c of the aperture driver 321 completely moves in the moving guide 311, the guide protrusions 3311, 3312, 3313, 3314, 3315, 3316, 3317, and 3318 move to the end in the guide slits 351b, 352b, 353b, 354b, 361b, 362b, 363b, and 364b, and the blades 351, 352, 353, 354, 361, 362, 363, and 364 may completely shield the center opening of the base 310. Therefore, a diameter of the light incident hole of the aperture module 300 may be variable by the lateral sides of the blades 351, 352, 353, 354, 361, 362, 363, and 364.

According to the aperture module according to the embodiment, the aperture operation that is close to a circle may allow for a reduced thickness with a small number of stages. Further, it is possible to minimize the size of the opening when the aperture is tightened, thus, advantageous to apply to an aperture requiring light blocking such as saturation of light.

Further, power consumption may be reduced by the reduction of the operational load when the aperture structure is opened and closed in a horizontal way, making the camera module slimmer and simpler.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An aperture module comprising:
a rotating plate, seated on a base having a center opening, configured to rotate about an optical axis;
an aperture driver including a moving member coupled to the rotating plate, wherein the moving member is configured to linearly reciprocate; and
a plurality of blades stacked as at least two stages on the rotating plate, disposed non-overlapping to each other on the respective stages, and configured to form a variable light incident hole interlocked with rotation of the rotating plate,
wherein straight lateral sides of the blades form the variable light incident hole when the center opening is completely opened, and cusps of the blades form the variable light incident hole when the center opening is completely closed.

2. The aperture module of claim 1, wherein
each of the blades has a pentagonal contour having a least internal angle formed at the cusp.

3. The aperture module of claim 1, wherein
the moving member includes an aperture driving magnet facing an aperture driving coil.

4. The aperture module of claim 1, wherein
the blades are stacked as two stages on the rotating plate, and groups of at least four blades disposed in a diagonal line at the respective stages are disposed to be point symmetric with each other.

5. The aperture module of claim 1, wherein
each of the blades includes a driving section having a fixed axis hole configured to engage a fixed axis protrusion protruding from the base, and a guide slit configured to engage a guide protrusion protruding from the rotating plate, and
a shield section extends along an exterior circumference of the rotating plate from the driving section when the center opening of the base is completely opened.

6. The aperture module of claim 5, wherein
each shield section of the blades includes the cusp.

7. The aperture module of claim 5, wherein
each shield section of the blades extends toward the center opening when the center opening of the base is completely closed.

8. The aperture module of claim 5, wherein
when the blades are stacked with the center opening of the base completely opened, the driving section of a blade disposed at a lower stage of the at least two stages in a stacking direction overlaps the shield section of a blade disposed at an upper stage of the at least two stages in the stacking direction.

9. The aperture module of claim 5, wherein
when the blades are stacked with the center opening of the base completely closed, the shield section of a blade disposed at a lower stage of the at least two stages in the stacking direction overlaps the shield section of a blade disposed at an upper stage of the at least two stages in the stacking direction.

10. The aperture module of claim 1, wherein
each of the blades is disposed to partially overlap two blades disposed at an upper or lower stage of the at least two stages.

11. A camera module comprising a lens driving module configured to be driven in an optical axis direction or a perpendicular direction to the optical axis, and the aperture module of claim 1.

12. A camera module comprising:
a housing having an internal space;
a lens driving module, accommodated in the internal space, configured to be driven in an optical axis direction or a perpendicular direction to the optical axis; and
an aperture module, disposed at a front of the lens driving module, configured to adjust an aperture, the aperture module comprising:
a rotating plate, seated on a base having a center opening, configured to rotate about an optical axis;
an aperture driver including a moving member coupled to the rotating plate, wherein the moving member is configured to linearly reciprocate; and
a plurality of blades stacked as at least two stages on the rotating plate, disposed non-overlapping to each other on the respective stages, and configured to form a variable light incident hole interlocked with rotation of the rotating plate,
wherein straight lateral sides of the blades form the variable light incident hole when the center opening is completely opened, and cusps of the blades form the variable light incident hole when the center opening is completely closed.

13. The camera module of claim 12, wherein
each of the blades has a pentagonal contour having a least internal angle formed at the cusp.

14. The camera module of claim 12, wherein
the moving member includes an aperture driving magnet facing an aperture driving coil.

15. The camera module of claim 14, wherein
the aperture driving coil is fixed to one side wall of the housing.

16. An aperture module comprising:
a rotating plate, seated on a base having a center opening, configured to rotate about an optical axis;
an aperture driver including a moving member coupled to the rotating plate, wherein the moving member is configured to linearly reciprocate; and
a plurality of blades, a first subset of the blades disposed on the rotating plate to be spaced apart from each other, and a second subset of the blades disposed on the first subset of the blades to partially overlap the first subset of the blades, wherein a variable aperture is formed with linear reciprocating movement of the moving member,
wherein straight lateral sides of the blades form the variable aperture when the center opening is completely opened, and apexes of the blades form the variable aperture when the center opening is completely closed.

17. The aperture module of claim 16, wherein each of the blades has a pentagonal contour.

18. The aperture module of claim 16, wherein the moving member includes an aperture driving magnet facing an aperture driving coil.

19. A camera module comprising a lens driving module configured to be driven in an optical axis direction or a perpendicular direction to the optical axis, and the aperture module of claim 16.

* * * * *